US011084953B2

(12) United States Patent
Akkerman et al.

(10) Patent No.: US 11,084,953 B2
(45) Date of Patent: Aug. 10, 2021

(54) WATERBORNE COATING COMPOSITION

(71) Applicant: Allnex Netherlands B.V., Bergen op Zoom (NL)

(72) Inventors: Jaap Michiel Akkerman, Goes (NL); Dirk Emiel Paula Mestach, Nijlen (BE); Wincenty Lambertus Stanislaw Pilaszek, Tholen (NL); Rob Adolphs, Bavel (NL)

(73) Assignee: Allnex Netherlands B.V., Bergen op Zoom (NL)

( * ) Notice: Subject to any disclaimer, the term of this patent is extended or adjusted under 35 U.S.C. 154(b) by 0 days.

(21) Appl. No.: 16/750,049

(22) Filed: Jan. 23, 2020

(65) Prior Publication Data

US 2020/0157375 A1 May 21, 2020

Related U.S. Application Data

(63) Continuation of application No. 14/004,423, filed as application No. PCT/EP2012/055356 on Mar. 26, 2012, now Pat. No. 10,597,553.

(30) Foreign Application Priority Data

Mar. 25, 2011 (EP) .................................. 11159886

(51) Int. Cl.
| | | |
|---|---|---|
| *C09D 133/12* | (2006.01) | |
| *C08F 220/18* | (2006.01) | |
| *C08F 220/28* | (2006.01) | |
| *C08F 283/00* | (2006.01) | |
| *C08G 18/34* | (2006.01) | |
| *C08G 18/62* | (2006.01) | |
| *C08G 18/69* | (2006.01) | |
| *C08G 18/75* | (2006.01) | |
| *C09D 133/14* | (2006.01) | |
| *C09D 151/08* | (2006.01) | |
| *C09D 175/14* | (2006.01) | |
| *C08G 18/08* | (2006.01) | |

(52) U.S. Cl.
CPC .......... *C09D 133/12* (2013.01); *C08F 220/18* (2013.01); *C08F 220/28* (2013.01); *C08F 283/002* (2013.01); *C08G 18/0823* (2013.01); *C08G 18/348* (2013.01); *C08G 18/6254* (2013.01); *C08G 18/69* (2013.01); *C08G 18/755* (2013.01); *C09D 133/14* (2013.01); *C09D 151/08* (2013.01); *C09D 175/14* (2013.01)

(58) Field of Classification Search
CPC .. C09D 133/12; C09D 133/14; C09D 151/08; C09D 175/14; C08F 220/18; C08F 220/28; C08F 283/002; C08G 18/0823; C08G 18/348; C08G 18/6254; C08G 18/69; C08G 18/755

USPC ........................................................ 524/501
See application file for complete search history.

(56) References Cited

U.S. PATENT DOCUMENTS

| | | | |
|---|---|---|---|
| 4,139,514 A | 2/1979 | Basset | |
| 4,552,908 A | 11/1985 | Nicks et al. | |
| 6,270,905 B1 * | 8/2001 | Swarup | C08F 290/062 428/461 |
| 6,610,776 B2 | 8/2003 | Laubender et al. | |
| 6,872,789 B2 | 3/2005 | Brinkhuis et al. | |
| 2001/0031826 A1 | 10/2001 | Laubender et al. | |
| 2002/0013414 A1 | 1/2002 | Ramesh et al. | |
| 2003/0162888 A1 | 8/2003 | Bremser et al. | |
| 2007/0043156 A1 | 2/2007 | Mestach et al. | |

FOREIGN PATENT DOCUMENTS

| | | |
|---|---|---|
| DE | 10029802 A1 | 1/2002 |
| EP | 0136025 A2 | 8/1984 |
| EP | 0210747 A1 | 2/1987 |
| EP | 0927198 A1 | 7/1999 |
| EP | 1125949 A1 | 2/2001 |
| EP | 1132436 A1 | 9/2001 |
| EP | 1492850 A1 | 1/2005 |
| EP | 1686160 A1 | 8/2006 |
| EP | 20024412 A1 | 2/2009 |
| GB | 2298427 A | 9/1996 |
| JP | 3135151 B2 | 2/2001 |
| WO | 20071131959 A1 | 11/2007 |
| WO | 20101066902 A1 | 5/2010 |

OTHER PUBLICATIONS

Barbour et al, Waterborne & Solvent Based Acrylics and Their End User Application, vol. 1, 1996 SITA Technology Limited, London, United Kingdom.
Bob Gilbert: 'Emulsion Polymerization, A Mechanistic Approach', 1995, Academic Press p. 245-291.
E.W. Duck: 'Encyclopedia of Polymer Science and Technology', vol. 5, 1966, John Wiley & Sons, Inc. p. 801-859.
N. S. Enikolopyan et al. J.Polym.Chem.Ed vol. 19, 1981, p. 879-889.

(Continued)

*Primary Examiner* — Ling Siu Choi
*Assistant Examiner* — Ronald Grinsted
(74) *Attorney, Agent, or Firm* — Hoyng Rokh Monegier B.V.; David P. Owen

(57) ABSTRACT

The invention relates to a method of making an aqueous coating composition comprising a blend of at least a first aqueous polymer dispersion and a second aqueous polymer dispersion comprising a film-forming second polymer wherein the first aqueous polymer dispersion comprises a first polymer having a number average molecular weight, Mn, of from 2000 to 120000, an acid value of 30 to 150 mg KOH/g, a glass transition temperature Tg of at least 20° C. as calculated with the Fox formula, and an ethylene-oxide content of from 1 to 20 wt %, the method comprising blending an aqueous dispersion of the first polymer having a solids content of 25 to 50 wt % and a pH of 4.5 to 8.0 with an aqueous dispersion of the second polymer having a solids content of 25 to 55 wt % and a pH of 4.5 to 8.0.

22 Claims, No Drawings

(56) References Cited

OTHER PUBLICATIONS

W. Bremser et al. Prog. Org. Coatings vol. 45, 2002, p. 95-99.
'Ullmanns Enzyklopadie der Technischen Chemie', vol. 19, 1980 p. 17-18.
International Search Report, dated Apr. 25, 2012.

* cited by examiner

WATERBORNE COATING COMPOSITION

BACKGROUND OF THE INVENTION

The invention relates generally to a polymer; a method of making the polymer; an aqueous dispersion comprising the polymer as a first polymer and a second dispersed polymer different from the first polymer; a method of making the aqueous dispersion; an aqueous coating composition comprising said aqueous dispersion; the use of the first polymer as an open time and wet edge time extender; a method of making said coating composition; a method of applying the coating composition to a substrate and an article coated with a cured layer of the coating composition.

DESCRIPTION OF THE RELATED ART

Legislation on the emission of volatile compounds is driving the switch from solvent borne to waterborne coating compositions. However, waterborne paints still need improvement to achieve, or to match, the advantageous properties of their solvent borne predecessors. A particular problem with waterborne coating compositions is the short period of time in which a freshly applied layer of coating can be re-manipulated without leaving brush marks, roller marks, or visible lines at joins between adjacent coating layers.

When a coating composition has been freshly applied to a substrate and is still in a state where it can be manipulated during its curing period without marking it is said to be open. The open time is the period of time between the point of first application of a coating layer up to the point where corrections can no longer be made in the wet paint film without leaving visible marks, such as brush marks or spray dust (commonly known as 'overspray').

When a coating composition has been first applied to a substrate and it is still possible to blend it with a subsequently added adjacent layer of coating during its curing period without a visible seam the coating is said to have a wet edge. The wet edge time is the time period between the point of fresh application of a coating layer up to the point when it is no longer fluid enough to blend with adjacent areas in a manner that does not leave a visible seam or lapline.

It is desirable to improve these characteristics for waterborne paints.

Examples of aqueous coating compositions that may benefit from an increased open time and wet edge time include: aqueous vinyl polymer dispersions, aqueous alkyd emulsions, aqueous polyurethane dispersions and mixes thereof. Such polymer dispersions can have excellent drying properties, chemical and water resistance and favorable mechanical properties such as hardness, block and scratch resistance but coating compositions based on these binders alone typically suffer from a short open or wet edge time.

It is believed to be the case that longer open time and wet edge time can be achieved by using water-soluble additives or co-binders in the formulation of coatings. For example, water-soluble co-solvents such as alkylene glycols (e.g. ethylene glycol, propylene glycol) are considered to have a beneficial influence on open time. Alternatively, water-soluble homopolymers are suggested to be useful to achieve extended open times in waterborne coatings (Examples of such polymers being polyvinyl alcohol, polyethylene glycol, poly(meth) acrylamide, polyvinylpyrrolidone or poly 2-ethyl oxazoline). Other alternatives include water-dispersible film-forming polymers, such as are described in U.S. Pat. No. 4,552,908, which have been suggested to be useful in formulating paints with improved brushability, lapping, and flow-out of brush-marks. Film-forming polymers in aqueous coating compositions typically are meant to be polymers that have a glass transition below room temperature, typically below 60, 45 or more commonly below 30° C., optionally in combination with a glass transition modifying substance, such that they have sufficient flowability to form a coherent film on a substrate in ambient use temperatures, preferably in a temperature range between 0 and 60° C.

However, it is a problem with water-soluble and water-dispersible polymers or oligomers that, because the content of hydrophilic groups in the polymers or oligomers is high, the resulting coatings exhibit poor water-resistance. This implicates only low levels can be applied, thus reducing the effectiveness of improving open time or wet edge time.

EP 0136025 describes the use of a polymer of defined molecular weight which contains either anionisable or cationisable groups and also non-ionisable water-soluble moieties (derived for example from polyethylene glycol) for formulating paints with extended open time. Since this polymer is completely water-soluble and is used as the sole binder the coating described exhibit poor water resistance.

U.S. Pat. No. 4,139,514 discusses addition of a water-soluble oligomer to a coating. The description refers to addition of an acid rich oligomer to latex to achieve an open time in excess of 20 minutes. However, the technology is limited to using an alkali-soluble oligomer which will result in water sensitivity of the final coating, thus requiring the addition of a melamine crosslinker and curing at elevated temperatures in order to achieve water resistance.

EP1132436 discusses the addition of polyalkylene oxide group modified (meth)acrylic monomer units to aqueous high gloss acrylic polymer dispersions. The polymer described however is thermoplastic so the chemical resistance and mechanical properties are expected to be inferior.

US 20010031826 A1 discusses addition of polyalkylene oxide group modified (meth)acrylic monomer units to aqueous high gloss acrylic polymer emulsions used as single binder in glossy paint formulations to improve open time. In order to obtain acceptable coatings properties in a thermoplastic polymer the molecular weight has to be high, typically above Mn 200,000. Consequently a high concentration of ethylene oxide monomer is necessary to obtain the desired application properties. The high concentration, however, will negatively influence the water resistance.

EP1492850 discusses blending of a non-crosslinking polyethylene glycol modified vinyl oligomer with a dispersed polymer. This document discusses inclusion of vinyl polymers incorporating 0-45 wt % polyethylene oxide functionality into oligomers used to extend open time and wet edge time. It is believed that claimed single use of non-ionic hydrophilic functionality—when used in a water dispersed polymer—leads to problems like water sensitivity, coagulation, depletion flocculation and other stability problems. When using the necessary high amount of non-ionic hydrophilic groups to obtain the claimed open time/wet edge properties, leads to unacceptable water resistance and stability.

EP 210747 discusses inclusion of eicosanols as evaporation suppressants in coating compositions to increase open time. However, because eicosanol additive boiling points are so high as to prevent their evaporation during curing, the additive remains in the cured coating and thus leads to water sensitivity problems.

Despite the progress made in the art, there remains a need for further improvement of the open time and wet edge time properties of waterborne coating compositions.

THE INVENTION

Therefore, according to the invention there is provided an aqueous coating composition comprising a blend of at least a first aqueous polymer dispersion and a second aqueous polymer dispersion comprising a film-forming second polymer wherein the first aqueous polymer dispersion comprises a first polymer having a number average molecular weight, Mn, of from 2000 to 120000 (determined by gel permeation chromatography using a mixture of tetrahydrofurane and acetic acid as eluent), an acid value of 30 to 150 mg KOH/g, and a ethylene-oxide content of from 1 to 20 wt %, and is obtainable by free radical polymerization of a monomer mixture comprising:
a) 5 to 20 wt % acid functional ethylenically unsaturated monomers or precursors thereof or ethylenically unsaturated monomers comprising ionic group precursors
b) 5 to 25 wt % ethylenically unsaturated monomers containing a polyethylene glycol or mono alkoxy polyethylene glycol moiety;
c) up to 90 wt % of non-ionic ethylenically unsaturated monomers other than a or b;
d) 0 to 10 wt % ethylenically unsaturated monomers with a functional group for crosslinking
e) 0 to 10 wt % of chain transfer agents;
wherein the sum of a) to e) is 100 wt %.

The first polymer is part of the coating composition and has the function of improving the open time and/or wet edge time of the film forming second polymer dispersion in the coating composition. Without any limitation to theory, it is believed that the particular monomer makeup of the first polymer provides for a polymer that is able to delay the onset of the phase transition from oil in water emulsion to water in oil emulsion that takes place on drying of a coating, and that even after this phase transition, a reverse transition is possible upon addition of fresh coating composition or water to the applied layer.

The first polymer and second polymer are present in the coating composition as two distinct blended dispersion systems, that is, the particles of the first polymer dispersion are distinct from the second polymer dispersion. It is believed that by mechanical blending of two different, stable aqueous dispersions of polymer particles, the polymer particles of each separate dispersion remain discrete and distinct from one another without substantial mixing of the polymers trapped within each particle. Preferably the aqueous coating composition comprises a blend of at least a first polymer binder existing as discrete particle and an second aqueous polymer binder also present as discrete particles.

Examples of suitable aqueous second dispersions are those wherein film forming second polymer is a vinyl polymer, polyurethane or alkyd or combinations thereof wherein the ratio—calculated on solid polymers—of the first to the second polymer preferably is 10/90 to 70/30, preferably 40/60 to 60/40. In a preferred embodiment the second polymer can be a vinyl polymer bearing carbonyl groups for cross-linking with a carbonyl reactive cross-linker. The second polymer can be an auto-oxidisable crosslinking organic polymer containing unsaturated fatty acid residues, preferably an auto-oxidisable polyurethane. In a particular embodiment the second polymer is an alkyd emulsion or urethane modified alkyd emulsion.

DETAILED DESCRIPTION OF THE INVENTION

In a particular aspect the invention relates to an aqueous dispersion, for use in the coating composition according to the invention as the first aqueous polymer dispersion, comprising a first polymer having a number average molecular weight (Mn) of from 2,000 to 120,000 (determined by gel permeation chromatography using a mixture of tetrahydrofurane and acetic acid as eluent), an acid value of from 30 to 150 mg KOH/g, and an ethylene-oxide wt % (on total solid polymer) of from 1 to 20 wt %, said first polymer dispersion being obtainable by free radical polymerization of a monomer mixture in the presence of at least one free-radical initiator and at least one surfactant, said monomer mixture comprising:
a) 5 to 20 wt %, preferably 7 to 10 wt %, acid functional ethylenically unsaturated monomers or precursors thereof or ethylenically unsaturated monomers comprising ionic group precursors;
b) 5 to 25 wt %, preferably 7 to 20 wt %, ethylenically unsaturated monomers containing polyethylene oxide, polyethylene glycol or mono-alkoxypolyethylene glycol moeity
c) up to 90 wt % of non-ionic ethylenically unsaturated monomers other than a) or b);
d) 0 to 10 wt % ethylenically unsaturated monomers with a functional group for crosslinking
e) 0 to 10 wt % of chain transfer agents;
f) up to 90 wt % non-ionic ethylenically unsaturated monomers other than c), wherein 30 to 90 wt %, more preferably 60 to 80 wt % comprise crosslinkable groups or precursors thereof;
wherein the sum of a) through f) is 100 wt %.

The surfactant preferably is is a reactive surfactant comprising a free radically reactive double bond, preferably having a general structure M+.—OOC—CH=CHCOOR, R—O—($CH_2$—$CH_2$—O)$_n$—$R_1$ or RO—($CH_2$—$CH_2$—O) n-X or blends thereof, wherein $R_1$ is an alkyl or hydrogen group, wherein X is an anionic group, preferably a sulphate or phosphate salt and wherein R is an organic group comprising: an allylic or maleic free radically reactive double bond and an alkyl, aryl or aralkyl group containing at least 8 carbons; and n is an integer from 0 to 50, more preferably 2 to 25, even more preferably 2 to 10, and most preferably 3 to 8 and M+ is a cation, preferably Na+, K+, Li+, NH4+ or a protonated or quaternary amine.
acid functional ethylenically unsaturated monomers
or precursors thereof or ethylenically unsaturated monomers comprising ionic group In the aqueous dispersion the acid functional ethylenically unsaturated monomers or precursors thereof or ethylenically unsaturated monomers comprising ionic group precursors a) comprise, respectively, carboxylic acid groups or carboxylic acid group precursors or sulphonic and phosphonic acid groups; preferred monomers are selected from the group consisting of: methacrylic acid, acrylic acid, itaconic acid, maleic acid or anhydride, citraconic acid and fumaric acid.

The polyethylene oxide containing ethylenically unsaturated monomers b) preferably comprise monomers of the general formula $R_3$—O—($CH_2$—$CH_2$—O)$_n$—$R_2$, wherein $R_3$ is acryl or methacryl; $R_2$ is H or alkyl, preferably comprising from 1 to 4 carbon atoms, n is an integer from 1 to 35, preferably more preferably 2 to 20 and most preferably 3 to 15.

The non-ionic ethylenically unsaturated monomers c) preferably comprise:
i. up to 100 wt % styrene and/or styrene derivatives
ii. up to 100 wt % of one or more non-ionic(meth)acrylic monomers
iii. up to 25 wt % vinyl monomers containing oxidative cross linking groups;
iv. up to 10 wt % vinyl monomers containing self cross linkable groups, preferably ketone functional monomers;
v. up to 15 wt % vinyl monomers containing hydroxyl groups;
vi. up to 5 wt % vinyl monomers containing wet adhesion promoters
wherein the sum of the weight of monomers i-vi=100 wt % of non-ionic ethylenically unsaturated monomers ci)

The first polymer can have a number average molecular weight (Mn) ranging from 2,000 to 120,000, but preferably from 4,000 to 12,000 and most preferably 5,000 to 10,000. The weight average molecular weight (Mw) is preferably from 8,000 to 50,000 and most preferably 10,000 to 25,000. The first polymer has a preferred polydispersity—as defined by the ratio of Mn/Mw—of 1.2 to 3.0, preferably 1.5 to 2.5. The number average molecular weight as well as the weight average molecular weight can be determined by gel permeation chromatography using THF/acetic acid as eluent. Methods to influence the molecular weight in emulsion polymerization are well known to those skilled in the art and are described for example in "Emulsion Polymerization, A Mechanistic Approach" by Bob Gilbert, 245-291, Academic Press, 1995.

Further, the Tg of the first polymer is preferably in the range 0 to 80° C., preferably 45 to 70° C., most preferably 50 to 70° C. The first polymer preferably has an acid value 45-80 mg KOH, wherein preferably in the aqueous composition the acid functional groups of the polymer are neutralized to an α value of from 0.05 to 0.70, preferably 0.10 to 0.25 and the aqueous dispersion has a pH of from 6.0 to 8.0, most preferably 6.5 to 7.5. Further, the polymer preferably has a an ethyleneoxide wt % of 1 to 20 wt %, preferably 5 to 12 wt %, on total solids.

The first polymer is obtainable by free-radical polymerization, preferably by aqueous emulsion polymerization. A general description of the emulsion polymerization process is given in E. W. Duck, Encyclopedia of Polymer Science and Technology (John Wiley & Sons, Inc.: 1966), Vol. 5, pp. 801-859. In a particular embodiment the first polymer may have a gradient morphology. In the process surfactants are used. Surfactants perform many functions in emulsion polymerization, including solubilizing hydrophobic monomers, determining the number and size of the dispersion particles formed, providing dispersion stability as particles grow, and providing dispersion stability during post-polymerization processing. Typical examples of surfactants used in emulsion polymerization are anionic surfactants like fatty acid soaps, alkyl carboxylates, alkyl sulphates, and alkyl sulfonates; nonionic surfactants like ethoxylated alkylphenol or fatty acids used to improve freeze thaw and shear stability. Often a combination of anionic surfactants or anionic and nonionic surfactants is used to provide improved stability.

A preferred alternative for using conventional surfactants is the use of reactive surfactants. These preferred surfactants have an ethylenically unsaturated bond that can participate in a free radical polymerization. Preferably the ethylenically unsaturated bond is a maleic or allylic double bond. These double bonds have a low reactivity compared to the (meth) acrylic or vinyl double bonds in the monomers a) to d) which ensures that the monomers a) to d) are preferentially reacted in the polymerisation of the first polymer over the reaction with the surfactant. Reversely, it is also preferred that the monomers a) to d) comprise (meth)acrylic and/or vinyl double bonds and no or no substantial amount of maleic or allylic double bonds. The reactive surfactants further have a hydrophobic moeity comprising an alkyl, aryl or aralkyl group containing at least 6, preferably at least 8 and more preferably at least 10 carbons and a hydrophilic moeity formed by an ionic group and/or a polyethyleneoxide group comprising between 0 and 50, preferably 2-25 even more preferably between 2 and 10 and most preferably 3-8 ethyleneoxide units. The reactive surfactants are preferably of a low molecular weight molecules and typically have a molecular weight of less than about 3000, less than 2500, or less than 2000 gr/mol. The reactive surfactants can be used either as sole-emulsifier or in combination with conventional surfactants. Suitable polymerizable surfactants include hemi-esters of maleic anhydride of the formula

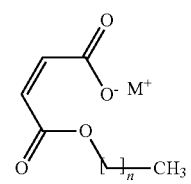

M+.—OOC—CH=CHCOOR wherein R is C(6-22) alkyl and M+ is Na+, K+, Li+, NH4+, or a protonated or quaternary amine. Other suitable polymerizable surfactants include polyoxyethylene alkylphenyl ethers with an ethylenically unsaturated bond represented by the following structure:

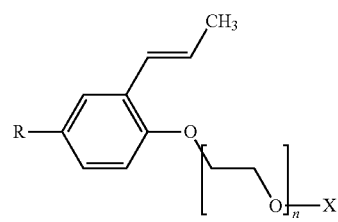

where R is alkyl with at least 8 carbon atoms, n is 2-25 and X is H, —SO$_3$H or —P(=O)(OH)$_2$ or salts thereof. Commercially available from Montello, Inc., sold under the tradename Noigen® RN MAXEMUL™ 6106 (available from Croda Industrial Specialties), which has both phosphonate ester and ethoxy hydrophilicity, a nominal C18 alkyl chain with reactive group that can react with (meth) acrylic monomers. Other representative reactive surfactants with phosphate ester functionalities suitable for such reactions include, but are not limited to, MAXEMUL™ 6112, MAXEMUL™ 5011, MAXEMUL™ 5010 (all available from Croda Industrial Specialties). Alternative reactive surfactants suitable for use with various embodiments of the present invention include sodium allyloxy hydroxypropyl sulphonate (available from Rhodia as SIPOMER COPS-1™), surfactants having the following formula:

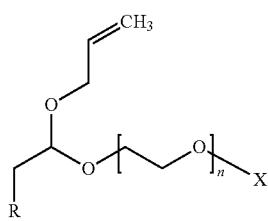

where R is alkyl with at least 8 carbon atoms, n is 2-25 and X is H, —$SO_3H$ or —$P(=O)(OH)_2$ or salts thereof. Commercially available from Adeka Co., Ltd. Under the tradename ADEKA REASOAP SR/ER series such as ADEKA REASOAP ER-10, ER-20, ER-30 and ER-40, Akeda Reasope SR-10, SR-20, SR-30 and allylsulphosuccinate derivatives (such as TREM LF-40™ (available from Cognis)).

In a preferred embodiment a chain transfer agent is used to bring the molecular weight between 2000 and 120000. Exemplary chain transfer agents are butyl mercaptan, mercaptopropionic acid, 2-ethylhexyl mercaptopropionate, n-dodecylmercaptan, t-dodecylmercaptan, n-butyl mercaptopropionate, mercaptoethanol, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate. Other, non sulfur based chain transfer agent include halogenated hydrocarbons or catalytic chain transfer agents such as Cobaltchelates such as used in N. S. Enikolopyan et al, J. Polym. Chem. Ed, Vol 19, 879 (1981). Also alpha-methyl styrene dimer or oligomers of alpha-methyl styrene dimer can be used as explained in US 2007/0043156 A1 and U.S. Pat. No. 6,872,789. Yet another method to synthesize polymer with a well defined molecular weight is the use of diarylethene. The use of diarylethene is described in detail in W. Bremser et al, Prog. Org. Coatings, 45, (2002), 95 and JP 3135151, DE 10029802 and US 2002/0013414. A commonly used diarylethene includes diphenylethene.

The first polymer comprises 5 to 20 wt %, preferably 7 to 10 wt % of acid functional ethylenically unsaturated monomers or ethylenically unsaturated monomers comprising acid functional group precursors. These acid functional groups can be carboxylic, sulphonic or phosphonic. Carboxylic acid groups are particularly advantageous because they lend themselves well to full dissociation to the ionic form when neutralized, so that they aid solubility in water, but have poor water solubility when not neutralized after evaporation of the neutralizing agent. Preferably, monomers such as (meth)acrylic acid are used. Other possible carboxylic acid-functional monomers are itaconic acid, fumaric acid maleic acid, citraconic acid, or the anhydrides thereof. Besides monomers having carboxylic acid functionality also monomers possessing an acid-functional group other than the carboxylic one can be present in the monomer composition, such as ethylmethacrylate-2-sulfonic acid or 2-acrylamido-2-methylpropane sulfonic acid. The concentration of the acid functional ethylenically unsaturated monomers is chosen to provide the first polymer with an acid value between 30-150 mg KOH/g, preferably 45-80 mg KOH/g on solid polymer as determined by ISO 3682.

The first polymer contains 5 to 25 wt %, preferably 7 to 20 wt % and most preferably 9-15 wt % polyethylene oxide ethylenically unsaturated monomers. The polyethylene oxide ethylenically unsaturated monomers preferably comprise from 2 to 50 ethylene oxide units, more preferably from 2 to 20, and most preferably from 2 to 15. The monomers are preferably polyethylene glycol (meth)acrylate monomers or mono methoxy (meth)acrylate monomers. Suitable examples of polyethylene oxide ethylenically unsaturated monomers ii) are methoxy polyethylene glycol 550 methacrylate and methoxy polyethylene glycol 350 methacrylate. Examples are Visiomer ETMA, Visiomer MPEG550MA (available from Evonik), Bisomer S20W, Bisomer PEA6 (available from Cognis). The concentration of polyethylene oxide ethylenically unsaturated monomers is chosen to provide the first polymer with an ethylene oxide wt % of 1 to 20 wt %, preferably 5 to 12 wt % on solid polymer. The percentage ethylene oxide calculation is based on the molecular weight of the EO unit—being 44—as a % of the molecular weight of the involved monomer and then taken as a % of the involved monomer over the total solid monomer composition.

As discussed above, the first polymer comprises up to 90 wt % non-ionic ethylenically unsaturated monomers c) (other than monomers a) or b)). Preferred monomers include esters of acrylic and methacrylic acid such as n-butyl (meth)acrylate, methyl (meth) acrylate, ethyl (meth) acrylate, 2-ethylhexyl (meth) acrylate, lauryl(meth)acrylate, cycloalkyl (meth) acrylates, e.g., isobornyl (meth) acrylate and cyclohexyl (meth) acrylate; and ethylenically unsaturated compound such as substituted or unsubstituted monovinylidene aromatic monomers including styrene, alphamethyl styrene, t-butylstyrene, vinyl toluene, o-, m-, and p-methylstyrene, o-, m-, and p-ethylstyrene; dienes such as 1,3-butadiene or isoprene; or mixtures thereof. Also, vinyl esters, such as vinyl acetate, vinyl alkanoate or their derivatives or mixtures thereof can be used in the monomer composition. Nitriles, such as (meth) acrylonitrile can also be used.

Other monomers possessing functional groups other than acidic groups can also be present in the monomer composition. In some cases these functional groups can be used for crosslinking of the first polymer upon drying. The first polymer can be adapted to crosslink with itself and/or the second polymer. Examples of monomers d) having crosslinkable groups include hydroxy-functional monomers such as hydroxyethyl (meth) acrylate, hydroxypropyl (meth) acrylate, hydroxybutyl (meth) acrylate, also monomers having latent hydroxy groups such as glycidyl methacrylate can be used. Hydroxy-functional groups can be cross-linked with polyisocyanates which may be blocked or not, melamines, and urea resins. Further examples include derivatives of (meth) acrylamide such as N-methylol (meth) acrylamide and diacetone acrylamide. Vinyl monomers possessing an acetoacetoxy functional group can also be present in the monomer composition. Examples of such vinyl monomers are acetoacetoxyethyl methacrylate, acetoacetoxyethyl acrylate, acetoacetoxy(methyl)ethyl acrylate, acetoacetoxypropyl acrylate, allyl acetoacetate, acetoacetamidoethyl (meth) acrylate, and acetoacetoxybutyl acrylate.

The monomers d) possessing functional groups can be used for crosslinking of the polymer. Crosslinkers for use in combination with they above functional groups are known to those skilled in the art. Crosslinking can occur at ambient or elevated temperature. The crosslinker may be already incorporated in the first polymer dispersion resulting in a self crosslinking polymer or can be added at a later stage.

A special case of a self crosslinking polymer dispersion is were the first polymer has auto oxidative groups like unsaturated fatty acid modified monomers or (meth)acryloyl modified monomers. This can be catalyzed by metal catalysts. The crosslinking can be catalysed by metal catalysts such as iron or cobalt complexes. Naturally the second binder can contain similar groups resulting in co-crosslinking between the binders.

Preferably the first polymer as discussed above has a glass transition temperature Tg of at least 0° C., preferably at least 20° C., more preferably at least 35° C., and most preferably at least 45° C. Preferably the polymer has a Tg between 0 to 80° C., and more preferably between 45 to 70° C. The Tg can be calculated with the Fox formula (see Ullmanns Enzyklopadie der Technischen Chemie, 4$^{th}$ Edition, Vol 19, Weinheim 1980 p 17 and 18) and by using Tg values of the homo-polymers as mentioned in table 1. Alternatively the Tg of the first polymer can be measured using Differential Scanning calorimetry.

TABLE 1

Tg values (K) of homo-polymers.

| | |
|---|---|
| methyl methacrylate | 105 |
| butyl methacrylate | 20 |
| methacrylic acid | 228 |
| lauryl methacrylate | −65 |
| Methoxy polyethylene glycol 230* methacrylate (ETMA) | −31 |
| Methoxy polyethylene glycol 350* methacrylate (MPEG350MA) | −17 |
| Methoxy polyethylene glycol 550* methacrylate (MPEG550MA) | −31 |
| Methoxy polyethylene glycol 750* methacrylate (MPEG750MA) | −58 |
| Adduct of sunflower fatty acid and glycidyl methacrylate | −60 |

*The glycol number refers to the average molecular weight of the polyglycol

The first polymer can be used to increase an open time, a wet edge time, and/or the hardness of an aqueous coating composition of a (second) polymer binder. Therefore, the invention also relates to the use of the first polymer or of the aqueous dispersion comprising the first polymer to increase an open time, a wet edge time, and/or the hardness of a coating composition.

The second polymer is at least a part of the binder system of the coating composition. The second polymer can be any aqueous polymer dispersion suitable for use as a waterborne coating composition binder, and is therein preferably cross linkable, and more preferably self cross linking. The composition of the coating composition can vary in broad ranges for example comprising:
 a) 2 to 75 wt %, preferably 30 to 60 wt %, more preferably 45-55 wt % (based on solids content) of the first polymer; and
 b) 2 to 75 wt %, preferably 30 to 60 wt %, more preferably 45-55 wt % (based on solids content) of the second polymer;
 based on total weight of a) and b).

The second polymer preferably has a measured weight average molecular weight of from 20,000 to 2,000,000, preferably 30,000 to 1,000,000, most preferably 40,000 to 120,000 g/mol. The second polymer preferably has a glass transition temperature Tg of from −30 to 80° C., preferably 0 to 45° C., more preferably 0 to 25° C.

Particular examples of such second polymer dispersions are self cross linking acrylic dispersions such as described in EP 0927198 and EP 1125949. Commercially available self-cross linking acrylic dispersions are Setaqua 6776, Setaqua 6782 available from Nuplex resins or NeoCryl XK-98 available from DSM NeoResins+

Examples of polyurethane or a polyurethane-acrylic hybrid dispersions include the binders described in WO2010/066902. A polyurethane dispersion that is particularly suited to use in the present invention is fatty acid modified to provide an auto-oxidisable cross linking polymer and is described in WO2007/131959. An example of such a polymer is Setaqua X11712, commercially available from Nuplex Resins BV. An example of a urethane-acrylic hybrid polymer dispersion is Rhodasol F115 also available from Nuplex Resins.

Suitable alkyd emulsions are generally prepared by preparing an alkyd binder by conventional polycondensation methods and emulsifying said binder in water afterwards. The hydrophilic groups needed to stabilize the alkyd particles in the aqueous phase can be ionic or non-ionic and can be introduced by the use of conventional surfactants or by modifying the alkyd during or after the synthesis with stabilizing groups. An example of such a polymer is Uradil AZ 554 Z-50, an alkyd dispersion ex DSM NeoResins+ or Dynotal LS82 ex Dyno ASA. Optionally, the alkyd emulsions are modified with di- or polyisocyanates prior or after emulsification. Alkyd emulsions thus modified have the advantage of drying faster than non-isocyanate modified alkyd emulsions. Examples of such products are Worléesol 150 E from Worlée, Setaqua 6002 and Setal 6004 ex Nuplex Resins. Blends of the polymer dispersions mentioned above can be used as well to make up the coating composition of the invention.

The polymer dispersions mentioned above have excellent drying properties, chemical and water resistance and favorable mechanical properties such as hardness, block and scratch resistance but coating compositions based on these binders alone typically suffer from a short open or wet edge time.

In order to improve the water compatibility of the first polymer and the second polymer and increase aqueous dispersion/emulsion stability, the free acid groups (e.g. carboxylic acid groups) of the acid monomers can be fully or partly neutralized. The neutralization is performed by addition of a neutralizing agent. The neutralizing agent can be added to the monomers or to the produced polymer. Suitable neutralization agents include metallic bases (e.g. potassium and sodium bases) or organic bases such as amines or ammonia, particularly ammonia or 2-amino-2-methyl-1-propanol).

The degree of neutralization of the first polymer can be indicated as α, wherein α=0.00 refers to the fully protonic state (no neutralization) and α=1.00 refers to full ionization (fully neutralized). Preferably a dispersion or emulsion of the polymer is neutralized to an α value from 0.05 to 0.70, more preferably 0.10 to 0.25. The α indicated is based on the calculated (by molar equivalence) degree of neutralization.

The invention also relates to a method of making a coating composition comprising blending an aqueous dispersion of the first polymer having a solids content of 25 to 50 wt %, preferably 30 to 40 wt % and a pH of 4.5 to 8.0, preferably 6.5 to 8.0, most preferably 6.5 to 7.5 with an aqueous dispersion of the second polymer having a solids content of 25 to 55 wt %, preferably 30 to 50 wt %; and a pH of 4.5 to 8.0, preferably 6.5 to 8.0.

Prior to the blending the aqueous dispersions of the first and second polymers preferably have difference in pH units less than 2.0, more preferably less than 1.5, and most preferably less than 1.0.

Advantageously, colloidal stability of the dispersion composition of the first and second polymer dispersions can be enhanced by matching the pH of the separate first and second polymer dispersions. This is done by neutralization of the acid functional groups on at least the first polymer using a neutralizing agent. The water preferably comprises less than 10 gr/ltr calcium ions. The second polymer may also contain ionic groups, particularly acid groups. To aid dispersibility these groups are also preferably partly or fully neutralized by addition of neutralizing agent(s).

In neutralizing the first and second polymer dispersions, care must be taken that the respective polymers retain their particulate nature. The degree of neutralization of the ionic (preferably acid) functional groups is chosen to avoid dissolution of the polymers.

The coating composition preferably comprises of a blend wherein the ratio—calculated on solid polymers—of the first to the second polymer is 10/90 to 70/30, preferably 40/60 to 60/40. The coating composition preferably comprises between 10-70 wt %, preferably 30-50 wt % of the first based on total solids of the coating composition.

As with coating compositions generally, auxiliary components can be included. In this respect the waterborne coating composition may further comprise one or more organic solvents that aid film-formation, a pigment (organic or inorganic) and/or other additives and fillers known in the art. When an organic solvent is used, water miscible solvents are preferred. The amount of organic solvent shall be chosen in such a way to provide a coating composition with a low volatile organic content (VOC), and preferably comprises less than 50 g/litre (including water), preferably less than 30 g/litre (including water) of volatile organic compounds, as calculated by ISO method 11890-2 it the ready to use form.

The coating composition may also include other auxiliary components such as additives or fillers used in formulating coatings. Examples include, but are not limited to, leveling, rheology, anti-block, and flow control agents such as silicones, fluorocarbons, urethanes, or cellulosics; extenders; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; or coalescing agents. The invention also relates to a paint composition comprising the coating composition and 1-50 wt % pigment.

The waterborne coating composition is preferably a colloidal dispersion or an emulsion. It preferably has a solids content of between 20 and 70 wt %, preferably between 30 and 55 wt % and a water content of 10 to 45 wt % (based on total weight of composition), a pH of from 2.0 to 9.0, preferably 4.5 to 8.0, most preferably 7.5 to 8.0.

In the coating composition the first polymer may have functional groups such as (meth)acryloyl functionality or oxidative functionality or acetoacetoxy functionality, that can co-cross link with oxidative or acetoacetoxy functionality when present on the second polymer. Alternatively, the first polymer has self cross linkable functionality and can co-cross link with a selfcross linking functionality on the second polymer. In a preferred embodiment at least one of the first or second polymer has oxidative cross linking functionality, and preferably the composition comprises a dryer catalyst, for example a metal catalysts, preferably cobalt, manganese or iron complexes.

The coating composition according to the invention preferably comprises no more than 20 wt % volatile organic solvent, preferably 5% and most preferably 3%.

The coating composition according to the invention may further comprise:
a) up to 20 wt % of isocyanate cross linker;
b) up to 20 wt % of polyhydrazide cross linker;
c) up to 10 wt % of a silane cross linker;
d) up to 10% of an (meth)acryloyl oligomer; and
e) up to 50 wt % of an aqueous polymeric dispersion or emulsified resin different to the first and second polymers.

As mentioned earlier the coating compositions in accordance with the present invention are suitable for a variety of coatings uses, for example, as paint, impregnating, sealing and bonding compositions. A preferred application is as a primer, topcoat, or clearcoat. The coating compositions may be applied to a substrate in any convenient manner such as, for example, by brushing, spraying or dipping. Suitable substrates include metals, wood, board, plastics and leather. The first polymer according to the invention provides i.a. good open time whereas articles coated with the coating or paint composition after curing have excellent coating properties.

The following is a description of certain examples of the invention, given by way of example only.

EXAMPLES

The following is a description of certain examples of the invention, given by way of example only. Examples 1 to 10 were all made as described in below for first polymer example 1. Differences in monomer composition and neutralization are depicted in tables 2 and 3.

Example 1. Preparation of Aqueous Polymeric Vinyl Dispersion Polymer Having Both Ethylene Oxide and Carboxylic Acid Functionality (Resin Example 1)

In an emulsion polymerization reactor the pre-emulsion was made as follows: 454 grams of water and 5 grams of an anionic polymerizable surfactant (Adeka Reasoap SR 1025, ex Adeka) was added and heated to 70° C. In the feed-tank a mixture of 117 grams of water, 22.8 grams of the anionic polymerizable surfactant Adeka Reasoap SR 1025 and 0.30 grams of sodium lauryl sulphate were mixed for 5 minutes. The monomer pre-emulsion was prepared by adding the following raw materials in the feed tank: 109.5 grams of methyl methacrylate, 24.2 grams of methoxy polyethyleenglycol 550 methacrylate (ex. Cognis), 24.2 grams of methacrylic acid, 145.7 grams of butyl methacrylate, 3.56 octyl mercaptane and 1.75 grams of mercapto ethanol. Emulsify the feed until a stable pre-emulsion was obtained.

Add 5 weight % of the pre-emulsion to the reactor. Heat the reactor to 80° C. Add a solution of 6.3 grams of water and 0.30 grams of ammonium persulphate to the reactor and wait for 5 minutes. Heat the reactor to 85° C., start feeding the pre-emulsified monomers from the feedtank and separately the initiator solution of 15.2 grams of water and 0.75 grams of ammonium persulphate. The reaction temperature was 85±2° C. The monomer feed dosing takes 60 minutes. The initiator feed was be 70 minutes. The following finishing steps were performed: rinse the feed tank with 21.0 grams of water and the initiator tank with 6.7 grams of water. Maintain the temperature for another 60 minutes after the feed has been completed. Cool the batch to 65° C., add a slurry of 4.0 grams of water and 0.75 grams of butyl hydroperoxide (70 weight % solution in water to the reactor and dose the solution 16.0 gram of water and 0.35 gram sodium formaldehyde sulphoxylate over a 15 minutes period. Keep the temperature for another 30 minutes. Cool to 25° C. At 25° C. add a solution of 3.1 gram Proxel AQ in 4.0 gram water, rinse with 4.0 grams of water and add the solution of 1.65 gram of 25 weight % ammonia solution in 4.0 grams of water. Rinse with 4.0 grams of water. An aqueous polymeric vinyl dispersion polymer having both ethylene oxide and carboxylic acid functionality was obtained with the following specifications: Solids content=32% pH=7.5; grit <100 ppm; residual monomer <100 ppm. Particle Size=122 nm. The molecular weight was determined by gel permeation chromatography using THF with 2% acetic acid as eluent: $M_n$=5,000 and $M_w$=13,200.

Examples 2-8. Preparation of Aqueous Polymeric Vinyl Dispersions Having Both Ethylene Oxide and Carboxylic Acid Functionality Further examples were made using the method described in example 1. The monomer mixtures used to prepare the pre-emulsions is given in table 2.

TABLE 2

Monomer compositions for pre-emulsions.

| Example | 2 | 3 | 4 | 5 | 6 | 7 |
|---|---|---|---|---|---|---|
| Methyl methacrylate | 10.96 | 10.99 | 10.99 | 10.99 | 11.00 | 10.98 |
| Methoxy polyethylene glycol methacrylate 550 | 4.92 | 2.34 | 2.25 | 2.64 | 2.43 | 2.43 |
| Methacrylic acid | 2.42 | 2.43 | 2.43 | 2.43 | 2.43 | 2.43 |
| Butyl methacrylate | 12.09 | 14.72 | 14.81 | 14.41 | 14.63 | 14.61 |
| N-Octyl mercaptane | 0.36 | 0.37 | 0.37 | 0.37 | 0.37 | 0.37 |
| 2-Mercapto ethanol | 0.18 | 0.18 | 0.18 | 0.18 | | 0.18 |

The molecular weights determined by GPC are:

| Example | $M_n$ | $M_w$ |
|---|---|---|
| 2 | 7000 | 14300 |
| 3 | 7300 | 15400 |
| 4 | 6800 | 12900 |
| 5 | 6300 | 13200 |
| 6 | 9100 | 19700 |
| 7 | 6500 | 13700 |

Examples 8-10. Preparation of Aqueous Polymeric Vinyl Dispersions Having Both Ethylene Oxide and Carboxylic Acid Functionality Further examples were made using the method described in example 1. The monomer mixtures used to prepare the pre-emulsions is given in table 3.

TABLE 3

Monomer compositions for pre-emulsions.

| | Example | | |
|---|---|---|---|
| | 8 | 9 | 10 |
| Methyl methacrylate | 10.99 | 10.99 | 10.01 |
| Methoxy polyethyleenglycol methacrylate 550 | 2.43 | 0.61 | 2.21 |
| Methacrylic acid | 2.43 | 2.43 | 2.21 |
| Butyl methacrylate | 8.41 | 14.63 | 13.33 |
| Adduct of sunflower fatty acid and glycidyl methacrylate | 6.20 | | |
| Lauryl methacrylate | | 1.82 | |
| N-Octyl mercaptane | 0.37 | 0.37 | 0.33 |
| 2-Mercapto ethanol | 0.18 | 0.18 | 0.16 |

For the final neutralization examples 9 and 10 used 0.17 grams of ammonia (aqueous 25%), whereas example 11 used 2.35 grams of 2-amino-2-methyl-1-propanol, The molecular weights determined by GPC are:

| Example | $M_n$ | $M_w$ |
|---|---|---|
| 8 | 7200 | 16300 |
| 9 | 6400 | 13300 |
| 10 | 6500 | 17600 |

Example 10. Coating Formulations According to the Invention

Different coating compositions were prepared according to the invention. All compositions are given in table 4. The oxidatively drying polyurethane dispersion used in these coating composition examples was prepared according to EP 2024412, example 1.

The open of the paint was determined by applying it onto a Leneta plain chart FORM WH with a bar applicator at 125 microns. Using the rubber eraser of a pencil with a width of at least of 2 mm, X-shaped crosses are being applied into the paint layer immediately after if has been applied. A brush (Elma acryl 93-14 or Pro-Gold Exclusive 7200-12) loaded with fresh paint and the excess paint is removed by scraping alongside the edge of the can. The fresh loaded brush is moved twice in the vertical direction of the width of the substrate and twice in the horizontal direction of the length of the substrate at the location of the X-shaped cross. This movement is repeated 10 times on the same cross ("10 cross-brushes"). This procedure is repeated after a one or two-minute interval on the next cross, until the cross stays visible even after 10 "cross-brushes" (one movement=twice in the direction of the width of the substrate and twice in the direction of the length of the substrate). The open is reported as the time in which the X-cross shape damage in the fresh applied film can be completely removed after 10 "cross-brushes" within the next interval of 1 or 2 minutes. 2 minutes intervals may be chosen to get a first indication of the open time; more accurate open time measure is followed by taking 1 minutes intervals.

Other properties of the coating compositions: ICI viscosity was measured according to ASTM D 4287, Gloss was measured according to ASTM D 2457 and König hardness was measured according to DIN 53157. The data are summarised in Table 4 which clearly illustrates the improvement in open time.

TABLE 4

Coating compositions according to the invention.

| Variation on ratio of first and second binder | Ratio on solids | | ICI viscosity (Poise) | Open time (min) | Gloss 20° after 7 days (%) | Koenig hardness after 7 days (s) |
|---|---|---|---|---|---|---|
| | first polymer dispersion | second polymer dispersion | | | | |
| First polymer dispersion: example 1. Second polymer dispersion: ex. 1 from EP2024412 | 0 | 100 | 3.0 | 10.0 | 55 | |
| | 25 | 75 | 2.7 | 9.0 | 49 | |
| | 50 | 50 | 2.6 | 12.0 | 57 | |
| | 60 | 40 | 2.4 | 9.0 | 47 | |
| First polymer dispersion: example 2. Second polymer dispersion: ex. 1 from EP2024412 | 0 | 100 | 3.4 | 9.5 | 74 | 29 |
| | 10 | 90 | 3.4 | 10.0 | 72 | 33 |
| | 20 | 80 | 3.1 | 10.0 | 71 | 34 |
| | 30 | 70 | 3.3 | 9.5 | 70 | 31 |
| | 40 | 60 | 3.0 | 11.5 | 66 | 35 |
| | 45 | 55 | 3.2 | 12.0 | 61 | 34 |
| | 50 | 50 | 3.1 | 14.0 | 52 | 35 |
| | 60 | 40 | 2.7 | 12.5 | 39 | 40 |

Example 11. Coating Compositions

In table 5, coating compositions are given of commercially available aqueous polymer dispersions (second polymer dispersion) with the aqueous polymer dispersion from example 2.

TABLE 5

Coating compositions.

| Resin | Gloss after 7 days 20° (%) | | Koenig Hardness after 7 days 50% RH (s) | | Open time (min) | |
|---|---|---|---|---|---|---|
| | As such | 1 to 1 blend with dispersion from example 2 | As such | 1 to 1 blend with dispersion from example 2 | As such | 1 to 1 blend with dispersion from example 2 |
| Setaqua 6004* | 54 | 69 | 22 | 35 | 12.0 | 17.0 |
| Rhodasol F115* | 42 | 31 | 108 | 122 | 4.0 | 10.0 |
| NeoCryl XK-98** | 21 | 27 | 45 | 68 | 11.0 | 16.0 |
| Worleesol 150 E*** | 60 | 57 | 41 | 67 | 13.0 | 16.0 |

*Available from Nuplex Resins
**Available from DSM Neoresins+
***Available from Worlée Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of making an aqueous coating composition comprising a blend of at least a first aqueous polymer dispersion and a second aqueous polymer dispersion comprising a film-forming second polymer
   wherein the first aqueous polymer dispersion comprises a
      first polymer having a number average molecular weight; Mn, of from 2000 to 120000 determined by gel permeation chromatography using a mixture of tetrahydrofuran and acetic acid as eluent, an acid value of 30 to 150 mg KOH/g, a glass transition temperature Tg of at least 20° C. as calculated with the Fox formula, and a ethylene-oxide content of from 1 to 20 wt %, and is obtained by free radical polymerization of a monomer mixture comprising:
   a) 5 to 20 wt % acid functional ethylenically unsaturated monomers or precursors thereof or ethylenically unsaturated monomers comprising ionic group precursors;
   b) 5 to 25 wt % ethylenically unsaturated monomers containing a polyethylene glycol or mono alkoxy polyethylene glycol moiety;
   c) up to 90 wt % of non-ionic ethylenically unsaturated monomers other than a) or b);
   d) 0 to 10 wt % ethylenically unsaturated monomers with a functional group for crosslinking; and
   e) 0 to 10 wt % of chain transfer agents;
   wherein the sum of a) to e) is 100 wt %,
   the method comprising blending an aqueous dispersion of the first polymer having a solids content of 25 to 50 wt % and a pH of 4.5 to 8.0 with an aqueous dispersion of the second polymer having a solids content of 25 to 55 wt % and a pH of 4.5 to 8.0.

2. The method of claim 1 wherein the film forming second polymer in the second aqueous polymer dispersion is a vinyl polymer, polyurethane or alkyd or combinations thereof.

3. The method of claim 1 wherein the second polymer is an aqueous vinyl polymer dispersion bearing carbonyl groups for cross-linking with a carbonyl reactive cross-linker or an auto-oxidisable organic polymer containing unsaturated fatty acid residues.

4. The method of claim 1, wherein the second polymer is an auto-oxidisable polyurethane containing unsaturated fatty acid residues or an alkyd- or urethane modified alkyd emulsion.

5. The method of claim 1 wherein the weight based on the solids content of the first polymer to the second polymer in the aqueous coating composition is 10/90 to 70/30.

6. The method of claim 1 wherein the aqueous coating composition has a pH from 4.5 to 8.0.

7. The method of claim 1 wherein the second polymer has a weight average molecular weight, Mw, of from 20,000 to 2,000,000 g/mol as measured by gel permeation chromatography using a mixture of tetrahydrofuran and acetic acid.

8. The method of claim 1 wherein the second polymer has a glass transition temperature Tg of from −30° C. to 80° C.

9. The method of claim 1 wherein the first polymer and second polymer have (meth)acryloyl, oxidative or acetoacetoxy functional groups for co-crosslinking.

10. The method of claim 1 wherein the aqueous coating composition comprises less than 20 wt % volatile organic solvent.

11. The method of claim 1 further comprising addition of one or more components chosen from the group consisting oil up to 20 wt % of isocyanate cross linker;
up to 20 wt % of polyhydrazide cross linker;
up to 10 wt % of a silane cross linker;
up to 10 wt % of an (meth)acryloyl oligomer; and
up to 50 wt % of an aqueous polymer dispersion different from the first and second polymer dispersion.

12. The method according to claim 1 wherein the first polymer dispersion is obtained by free radical polymerization of the monomer mixture in the presence of at least one free-radical initiator and at least one surfactant, wherein the surfactant is a reactive surfactant comprising a free radically reactive double bond.

13. The method according to claim 1 wherein the first polymer dispersion is obtained by free radical polymerization of the monomer mixture in the presence of at least one free-radical initiator and at least one surfactant; wherein the surfactant is a reactive surfactant comprising a free radically reactive double bond having a general structure M+—OOC—CH═CHCOOR, RO—(CH2-CH2-O)n-R1 or RO—(CH2-CH2-O)n-X or blends thereof, wherein R1 is an alkyl or hydrogen group, wherein X is an anionic group, and wherein R is an organic group comprising: an allylic or maleic free radically reactive double bond and an alkyl, aryl or aralkyl group containing at least 8 carbons; and n is an integer from 0 to 50 and M+ is Na+, K+, Li+, NH4+ or a protonated or quaternary amine.

14. The method according to claim 1 wherein the monomer mixture comprises ionic ethylenically unsaturated monomers or precursors a) comprising one or more groups chosen from the group consisting of carboxylic acid groups, carboxylic acid precursor groups, sulphonic acid groups and phosphonic acid groups.

15. The method according to claim 1 wherein the monomer mixture comprises ethylenically unsaturated monomers containing polyethylene oxide b) of the general formula R3—O—(CH2-CH2-O)n-R2, wherein R3 is acryl or methacryl; R2 is H or alkyl, n is an integer from 1 to 35.

16. The method according to claim 1 wherein the monomer mixture comprises one or more non-ionic ethylenically unsaturated monomers c) chosen from the group consisting of:
 i. up to 100 wt % styrene and/or styrene derivatives;
 ii. up to 100 wt % of one or more non-ionic(meth)acrylic monomers;
 iii. up to 25 wt % vinyl monomers containing oxidative crosslinking groups;
 iv. up to 10 wt % vinyl monomers containing self-crosslinkable groups;
 v. up to 15 wt % vinyl monomers containing hydroxyl groups and;
 vi. up to 5 wt % vinyl monomers containing wet adhesion promoters wherein the sum of the weight of monomers i-vi=100 wt % of non-ionic ethylenically unsaturated monomers c).

17. The method according to claim 1 wherein the first polymer has a number average molecular weight (Mn) of 4,000 to 12,000 g/mol and has a polydispersity of 1.2 to 3.

18. The method according to claim 1 wherein the acid functional groups of the first polymer are neutralized to an alpha value of from 0.05 to 0.70 and wherein the pH is from 6.0 to 8.0.

19. The method according to claim 1 wherein the acid functional groups of the first polymer are neutralized to an alpha value of from 0.10 to 0.25 and wherein the pH is from 6.5 to 7.5.

20. The method according to claim 1 wherein the pH difference of the first and second polymer dispersion is less than 2.

21. The method according to claim 16 wherein the monomer mixture comprises iv) up to 10 wt % vinyl monomers containing self-crosslinkable groups, which are ketone functional monomers.

22. The method according to claim 17 wherein the first polymer has a number average molecular weight (Mn) of 5,000 to 10,000 g/mol and has a polydispersity of 1.5 to 2.5.

* * * * *